US011513633B1

(12) United States Patent
Shen et al.

(10) Patent No.: US 11,513,633 B1
(45) Date of Patent: Nov. 29, 2022

(54) SYSTEM AND METHOD FOR MITIGATING IMPULSE NOISE AND BURST NOISE IN TOUCH SENSING

(71) Applicant: Synaptics Incorporated, San Jose, CA (US)

(72) Inventors: Guozhong Shen, San Jose, CA (US); Chunbo Liu, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/562,163

(22) Filed: Dec. 27, 2021

(51) Int. Cl.
*G06F 3/041* (2006.01)
*G06F 3/044* (2006.01)

(52) U.S. Cl.
CPC ........ *G06F 3/04182* (2019.05); *G06F 3/0443* (2019.05); *G06F 3/04166* (2019.05)

(58) Field of Classification Search
CPC ............. G06F 3/04182; G06F 3/04166; G06F 3/04184; G06F 3/0416; G06F 3/041–047; G06F 2203/041–04113; G06F 3/0446; G06F 2203/04808; H01L 27/323; G01R 27/2605; G01R 29/26; G02F 1/13338
See application file for complete search history.

(56) References Cited

U.S. PATENT DOCUMENTS

2019/0034028 A1* 1/2019 Stevenson ........... G06F 3/04186

* cited by examiner

*Primary Examiner* — Sanjiv D. Patel
(74) *Attorney, Agent, or Firm* — Leydig, Voit & Mayer, Ltd.

(57) ABSTRACT

An input device comprising a set of electrodes configured to detect a user input of a user and a processing system is provided. The processing system comprises a signal level monitor configured to detect burst noise or impulse noise and one or more processors configured to: perform a scan step of a plurality of scan steps by driving one or more first transmitter electrodes of the plurality of transmitter electrodes with one or more sensing signals; obtain one or more first resulting signals corresponding to the one or more sensing signals used to drive the one or more first transmitter electrodes; detect, based on the one or more first resulting signals, the burst noise or the impulse noise corresponding to the scan step; and in response to detecting the burst noise or the impulse noise, restart the scan step.

20 Claims, 9 Drawing Sheets

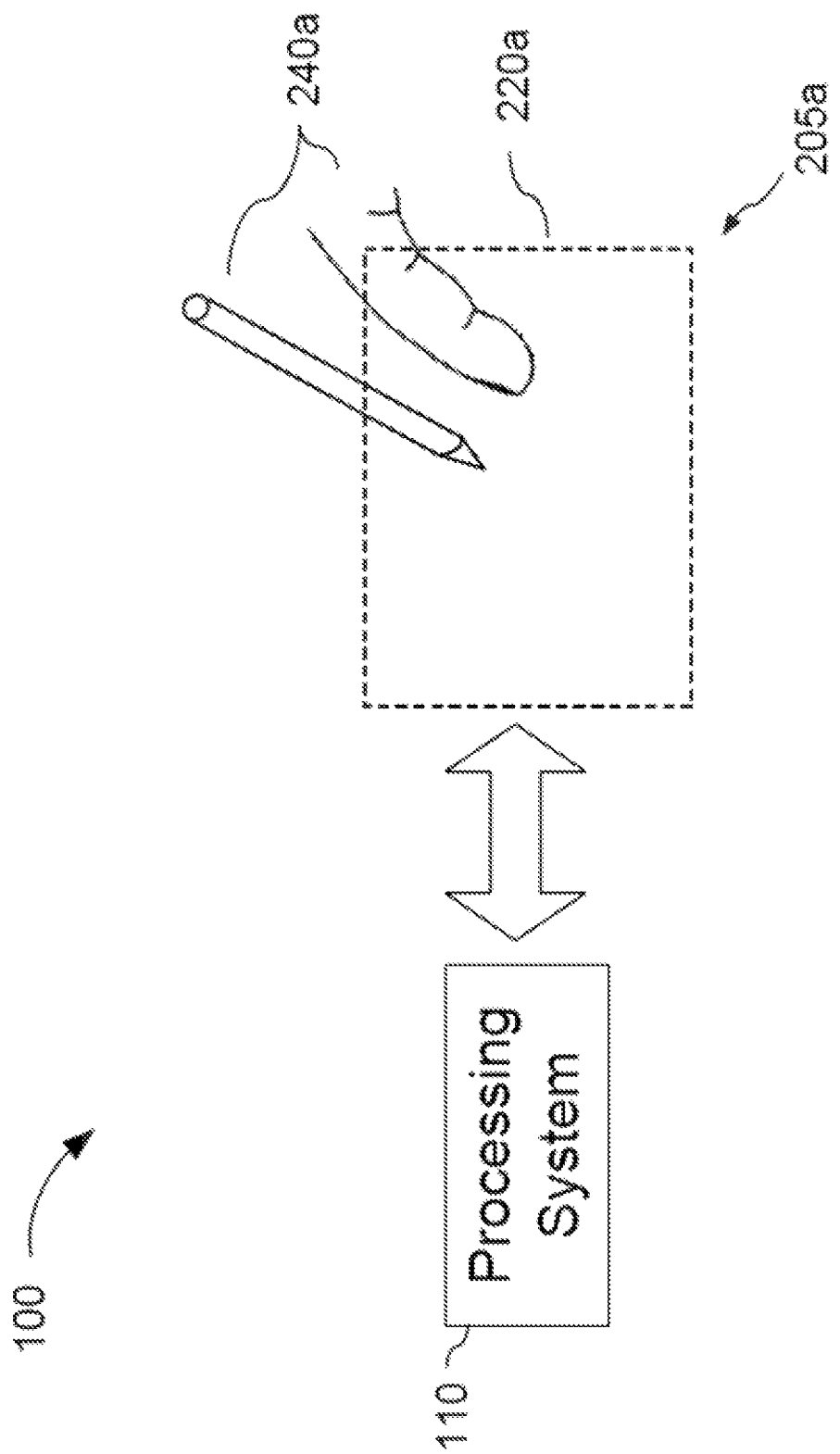

SYSTEM AND METHOD FOR MITIGATING IMPULSE NOISE AND BURST NOISE IN TOUCH SENSING

BACKGROUND

Input devices such as touch sensor devices (also commonly called touchpads or proximity sensor devices), are widely used in a variety of electronic systems. Touch sensor devices typically include a sensing region, often demarked by a surface, in which the touch sensor device determines the presence, location and/or motion of one or more input objects, typically for purposes allowing a user to provide user input to interact with the electronic system. Another type of input device may be a touchscreen that includes a plurality of electrodes and is also capable of allowing the user to provide user input to interact with the electronic system.

Noise such as impulse noise and/or burst noise may impact the functionality of touch sensor devices. In particular, impulse noise and/or burst noise may cause the touch sensor device to be not as responsive, to detect a ghost finger (e.g., detect a user input such as a user's finger that is not actually there), and/or a finger drop (e.g., unable to detect a user input such as user's finger even though the user's finger is on the touch sensor). Impulse and burst noises are noises that may occur during charging of a touch sensor device (e.g., charging of a smartphone). Impulse and burst noises may have certain distinctive attributes such as having a high amplitude (e.g., impulse noise may be around 1.2 kilo Volts (kV) and burst noise may be around 4 kV) and/or a narrow pulse width (impulse noise may be around 1 microsecond (μs) and burst noise may be around 30-60 nanoseconds (ns)).

SUMMARY

This summary is provided to introduce a selection of concepts in a simplified form that are further described below. This summary is not intended to necessarily identify key features or essential features of the present disclosure. The present disclosure may include the following various aspects and embodiments.

In an exemplary embodiment, the present disclosure provides an input device comprising a set of electrodes configured to detect a user input and a processing system. The set of electrodes comprises a plurality of transmitter electrodes; and a plurality of receiver electrodes. The processing system comprises a signal level monitor configured to detect burst noise or impulse noise; and one or more processors configured to: perform a scan step of a plurality of scan steps by driving one or more first transmitter electrodes of the plurality of transmitter electrodes with one or more sensing signals; obtain, via one or more receiver electrodes of the plurality of receiver electrodes, one or more first resulting signals corresponding to the one or more sensing signals used to drive the one or more first transmitter electrodes; detect, using the signal level monitor and based on the one or more first resulting signals, the burst noise or the impulse noise corresponding to the scan step; in response to detecting the burst noise or the impulse noise, restart the scan step; obtain, via the one or more receiver electrodes, one or more second resulting signals corresponding to the restarted scan step; and determine the user input based on the one or more second resulting signals.

In another exemplary embodiment, the present disclosure provides a method comprising: performing, by an input device, a scan step of a plurality of scan steps by driving one or more transmitter electrodes with one or more sensing signals; obtaining, by the input device and via one or more receiver electrodes, one or more first resulting signals corresponding to the one or more sensing signals used to drive the one or more transmitter electrodes; detecting, by the input device, using a signal level monitor, and based on the one or more first resulting signals, burst noise or impulse noise corresponding to the scan step; in response to detecting the burst noise or the impulse noise, restarting, by the input device, the scan step; obtaining, by the input device and via the one or more receiver electrodes, one or more second resulting signals corresponding to the restarted scan step; and determining, by the input device, a user input of a user based on the one or more second resulting signals.

In yet another exemplary embodiment, the present disclosure provides a non-transitory computer-readable medium having processor-executable instructions stored thereon. The processor-executable instructions, when executed, facilitate performance of the following: performing a scan step of a plurality of scan steps by driving one or more transmitter electrodes with one or more sensing signals; obtaining, via one or more receiver electrodes, one or more first resulting signals corresponding to the one or more sensing signals used to drive the one or more transmitter electrodes; detecting, using a signal level monitor and based on the one or more first resulting signals, burst noise or impulse noise corresponding to the scan step; in response to detecting the burst noise or the impulse noise, restarting the scan step; obtaining, via the one or more receiver electrodes, one or more second resulting signals corresponding to the restarted scan step; and determining a user input of a user based on the one or more second resulting signals.

Further features and aspects are described in additional detail below with reference to the FIGs.

BRIEF DESCRIPTION OF THE DRAWINGS

FIGS. 2A-2B are block diagrams depicting further exemplary input devices according to one or more examples of the present application.

DETAILED DESCRIPTION

Figure 1:
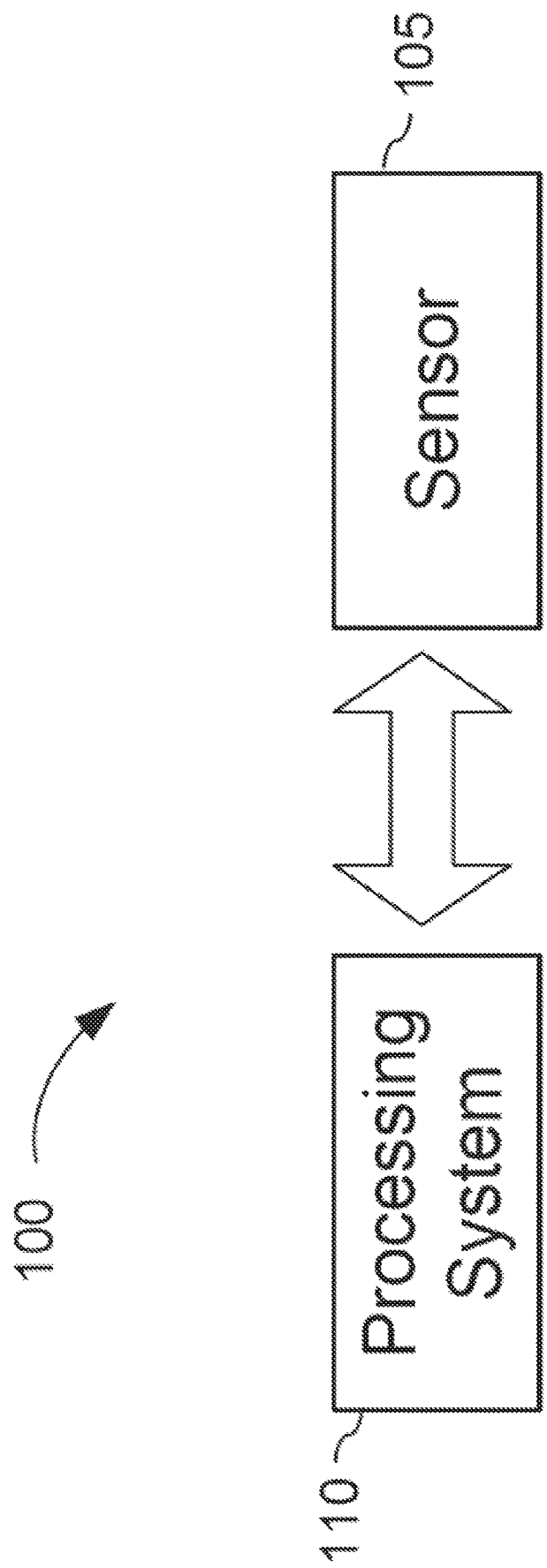
FIG. 1 is a block diagram depicting an input device according to one or more examples of the present application.

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

Exemplary devices and methods discussed herein provide for mitigating burst noise and impulse noise for input devices such as computing devices with a touchpad or touch screen. The input device may be and/or include, but are not limited to, a laptop, mobile device, gaming device, liquid-crystal display (LCD) devices, light-emitting diode (LED) devices, organic LED (OLED) devices, youm on-cell touch active-matrix organic light-emitting diode (Y-OCTA) devices, and/or other types of devices. In operation, the input device may encounter noise such as burst noise and/or impulse noise. For instance, during charging of the input device, the input device may encounter burst noise and/or impulse noise. Impulse and burst noises are noises that may occur during charging of a touch sensor device (e.g., charging of a smartphone). Impulse and burst noises may have certain distinctive attributes such as having a high amplitude (e.g., impulse noise may be around 1.2 kiloVolts (kV) and burst noise may be around 4 kV) and/or a narrow pulse width (impulse noise may be around 1 microsecond (µs) and burst noise may be around 30-60 nanoseconds (ns)). Traditionally, conventional methods for reducing the impulse/burst noise include dropping one or more samples during a scan step. However, this reduces the frequency response of the devices. For example, out-band noise rejection may become significantly worse when certain samples are dropped from the scan step, which may result in a much bigger portion of display noise interfering with touch frame data. For instance, by dropping one sample out of one hundred, noise suppression may be about 40 decibels (dB) worse, which may result in the noise being one hundred times larger.

As such, by using devices and methods according to exemplary embodiments of the present disclosure and in contrast to traditional methods and devices, burst noise and impulse noise is mitigated while also maintaining a satisfactory frequency response. In particular, to mitigate or reduce the impact of burst noise and impulse noise according to exemplary embodiments of the application, the input device may configure (e.g., set) the length of each scan step in such a way to avoid having multiple instances of burst or impulse noise within a scan. Thus, by avoiding multiple instances of burst or impulse noise within a scan, the input device is able to re-perform the scan step in response to detection of the burst or impulse noise so as to provide a satisfactory frequency response while also minimizing the impact to the overall sensing time. In other words, the present disclosure provides an input device that includes a signal level monitor. The signal level monitor detects whether burst noise and/or impulse noise has been encountered. Based on detecting burst noise and/or impulse noise, the input device may restart a scan step (e.g., re-initiate the same scan step by re-driving one or more transmitter electrodes of the input device).

Therefore, by using the devices and methods of the present disclosure, the resultant frame is not impacted by burst/impulse noise (e.g., whenever a scan step encounters burst/impulse noise, the scan step is performed again and finishes before the next burst noise is encountered). Overall, devices and methods from the present disclosure has much better performance than existing input devices.

FIG. 1 is a block diagram depicting an input device according to one or more examples of the present application. The input device 100 may be configured to provide input to an electronic system. As used herein, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, video game machines (e.g., video game consoles, portable gaming devices, and the like), LED devices, LCD devices, Y-OCTA devices, and/or other types of display devices. Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

The input device 100 may be implemented as a physical part of the electronic system, or can be physically separate from the electronic system. As appropriate, the input device 100 may communicate with parts of the electronic system using any one or more of the following: buses, networks, and other wired or wireless interconnections. Examples include Inter-Integrated Circuit (I2C), Serial Peripheral Interface (SPI), Personal System/2 (PS/2), Universal Serial Bus (USB), Bluetooth, radio frequency (RF), and Infrared Data Association (IRDA).

In FIG. 1, a sensor 105 is included with the input device 100. The sensor 105 comprises one or more sensing elements configured to sense input provided by one or more input objects in a sensing region. Examples of input objects include fingers, styli, and hands. The sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 comprises one or more sensing elements for detecting user input. Some implementations utilize arrays or other regular or irregular patterns of sensing elements to detect the input object. The input device 100 may utilize different combinations of sensor components and sensing technologies to detect user input in the sensing region.

The input device 100 is a capacitance (e.g., transcapacitive) input device, wherein voltage or current is applied to create an electric field. Nearby input objects cause changes in the electric field, and produce detectable changes in capacitive coupling that may be detected as changes in voltage, current, or the like.

The input device utilizes arrays or other regular or irregular patterns of capacitive sensing elements to create electric fields. In some instances, separate sensing elements may be ohmically shorted together to form larger sensor electrodes. Some other instances may utilize resistive sheets, which may be uniformly resistive.

The input device may utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "drive electrodes") and one or more receiver sensor electrodes (also "receiver electrodes" or "pickup electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may be, for example, a substantially constant voltage or system ground. In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some implementations of the input device 100 are configured to provide images that span one, two, three, or higher dimensional spaces. The input device 100 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

The input device 100 may be implemented as a fingerprint sensor having a sensor resolution high enough to capture discriminative features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, a fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, a fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some exemplary imaging areas for partial placement sensors include an imaging area of 100 mm$^2$ or less. In another exemplary embodiment, a partial placement sensor has an imaging area in the range of 20-50 mm$^2$. In some implementations, the partial fingerprint sensor has an input surface that is the same size the imaging area.

In FIG. 1, a processing system 110 is included with the input device 100. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device 100 and/or receiver circuitry configured to receive resulting signals with the sensing hardware. For example, a processing system may be configured to drive transmitter signals onto transmitter sensor electrodes of the sensor 105, and/or receive resulting signals detected via receiver sensor electrodes of the sensor 105.

The processing system 110 may include a non-transitory computer-readable medium having processor-executable instructions (such as firmware code, software code, and/or the like) stored thereon. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor 105 of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface. The display device may be any suitable type of dynamic display capable of displaying a visual interface to a user, including an inorganic light-emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2B:
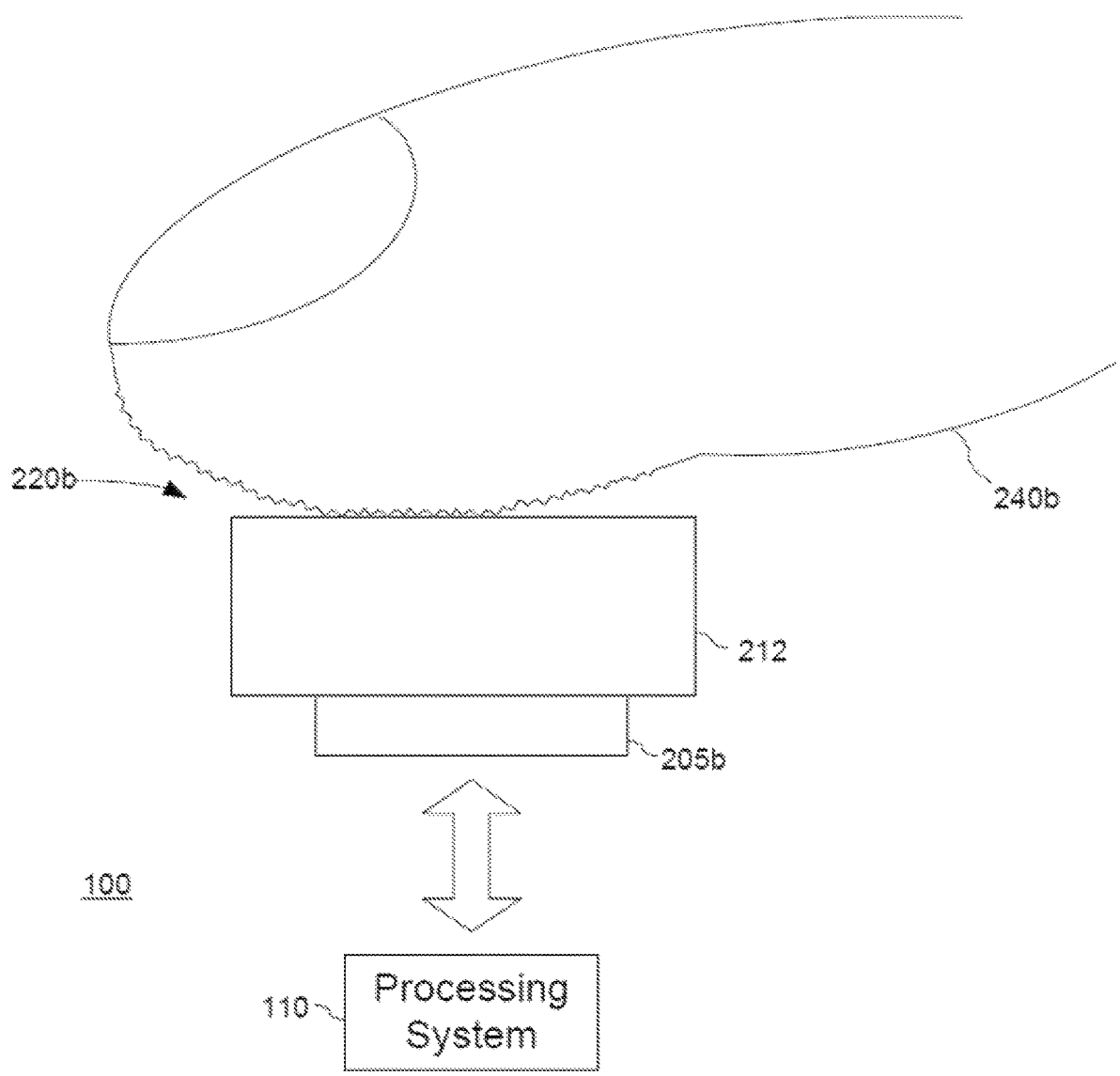

FIGS. 2A-2B are block diagrams depicting further exemplary input devices. In FIG. 2A, the input device 100 is shown as including a touch sensor 205a. The touch sensor 205a is configured to detect position information of an input object 240a within the sensing region 220a. The input object 240a may include a finger or a stylus, as shown in FIG. 2A. The sensing region 220a may include an input surface having a larger area than the input object. The touch sensor 205a may include an array of sensing elements with a resolution configured to detect a location of a touch to the input surface.

In FIG. 2B, the input device 100 is shown as including a fingerprint sensor 205b. The fingerprint sensor 205b is configured to capture a fingerprint from a finger 240b. The fingerprint sensor 205b is disposed underneath a cover layer 212 that provides an input surface for the fingerprint to be placed on or swiped over the fingerprint sensor 205b. The sensing region 220b may include an input surface with an area larger than, smaller than, or similar in size to a full fingerprint. The fingerprint sensor 205b has an array of sensing elements with a resolution configured to detect surface variations of the finger 240b, and the fingerprint sensor 205b has a higher resolution than the touch sensor 205a of FIG. 2A.

Figure 3:
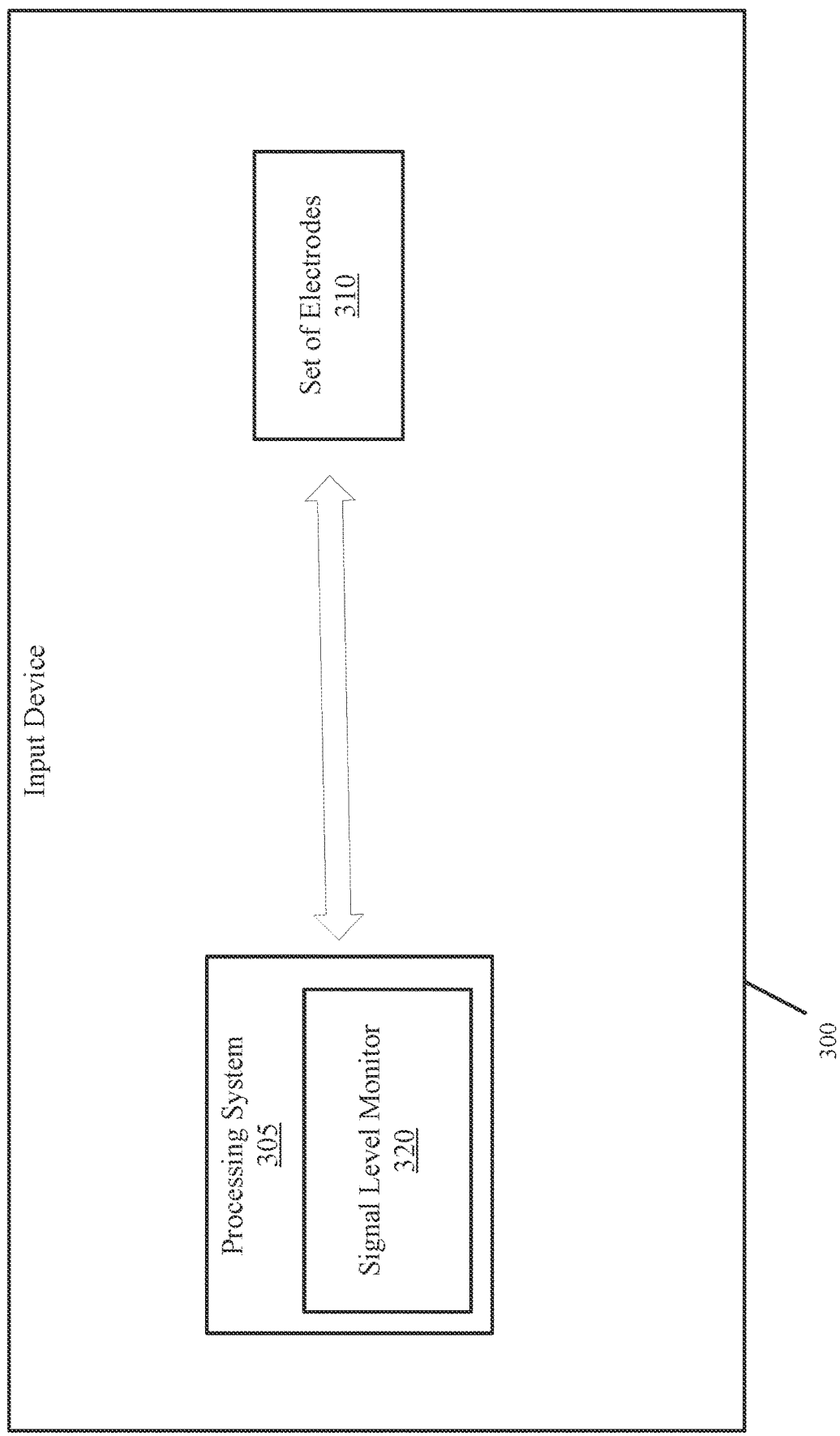
FIG. 3 is a block diagram depicting an exemplary input device that mitigates burst noise and impulse noise according to one or more examples of the present application.

FIG. 3 is a block diagram depicting an exemplary input device that mitigates burst noise and impulse noise according to one or more examples of the present application. In particular, the input device 300 includes the processing system 305 and a set of electrodes 310. The processing system 305 may include the functionalities of the processing system 110 described above in FIGS. 1, 2A, and 2B. Additionally, the processing system 305 includes a signal level monitor 320, which is configured to detect burst noise and/or impulse noise.

The set of electrodes 310 may be configured for absolute capacitance-based touch sensing and/or may be configured for transcapacitive touch sensing. In the case of transcapacitive touch sensing, the set of electrodes 310 may include one or more transmitter electrodes and one or more receiver electrodes. The set of electrodes 310 may include the functionality of the sensor 105 described in FIG. 1. For instance, in operation, the set of electrodes 310 may be configured to sense input provided by one or more input objects such as fingers, styli, hands, and so on. For example, the transmitter electrodes may be drive electrodes that are configured to drive sensing signals (e.g., transmitter signals) of the input device 300. The receiver electrodes may receive resulting signals that are associated with the sensing signals. In other words, based on instructions from the processing system 305, the transmitter electrodes may be configured to provide a signal (e.g., a sensing or drive signal) that is detectable by the receiver electrodes. The receiver electrodes may detect this signal (e.g., a resulting signal or sensing signal), and provide the resulting signal to the processing system 305. The processing system 305 may detect user input (e.g., input from an input object such as a user's finger) based on the resulting signals.

In some variations, the processing system 305 may use a plurality of scan steps to detect the user input. For instance, the set of electrodes 310 may include a plurality of transmitter electrodes and a plurality of receiver electrodes. At each scan step, the processing system 305 may drive one or more of the transmitter electrodes, and one or more of the receiver electrodes may detect the resulting signal. For example, the set of electrodes 310 may include 20 transmitter electrodes and 20 receiver electrodes. At each scan step, the processing system 305 may drive one of the 20 transmitter electrodes. For instance, the processing system 305 may use 20 scan steps, with each scan step driving one of the 20 transmitter electrodes, to obtain frame data (e.g., 20 sets of resulting signals from the receiver electrodes). The processing system 305 may use the frame data (e.g., the resulting signals from the receiver electrodes) to detect the user input (e.g., determine whether an input object is on the touch screen/display). In some instances, during each scan step, one or more receiver electrodes may detect the resulting signal. For instance, each transmitter electrode may have a receiver electrode pair that is configured to obtain a resulting signal based on the transmitter electrode providing a sensing signal. Additionally, and/or alternatively, more than one receiver electrode may obtain a resulting signal from the transmitter electrode. For example, a plurality of receiver electrodes (e.g., 2 receiver electrodes, 5 receiver electrodes, all 20 receiver electrodes, or other numbers of receiver electrodes) may obtain a resulting signal from the transmitter electrode.

In some variations, the transmitter and receiver electrodes may be placed on different locations of the input device 300 (e.g., on different locations of a touch screen). For instance, the transmitter electrodes may be horizontal or vertical bar electrodes that are spaced apart on a touch screen. At a first scan step, a first transmitter electrode (e.g., the top-most or left-most transmitter electrode) may drive a sensing signal, and one or more receiver electrodes may obtain a resulting signal based on the sensing signal from the first transmitter electrode. Then, at a second scan step, a second transmitter electrode (e.g., the second from the top or the second from the left transmitter electrode) may drive a sensing signal, and one or more receiver electrodes may obtain a resulting signal based on the sensing signal from the second transmitter electrode. The process may continue until the scan steps are complete. Afterwards, based on the frame data (e.g., the resulting signals from the scan steps), the processing system 305 detects whether there is a user input (e.g., a user's finger on the touchscreen of the input device 300). The number of transmitter and receiver electrodes from the set of electrodes 310 as well as the location of the electrodes is merely exemplary and the input device 300 may include any number of transmitter and receiver electrodes (e.g., 20 transmitter electrodes and 40 receiver electrodes) that are located at any location on the input device 300.

Additionally, and/or alternatively, in some examples, the processing system 305 drives more than one transmitter electrode at each scan step. For instance, the processing system 305 may drive a plurality of transmitter electrodes (e.g., two transmitter electrodes, four transmitter electrodes, all twenty transmitter electrodes, or other number of transmitter electrodes), and the receiver electrodes may obtain resulting signals based on driving the plurality of transmitter electrodes. The number of transmitter electrodes being driven at each scan step as well as the number of receiver electrodes that obtain the resulting signals based on driving the transmitter electrodes are merely exemplary, and the processing system 305 may drive any number of transmitter electrodes as well as obtain any number of resulting signals from the receiver electrodes at each scan step.

After completing the plurality of scan steps (e.g., after the processing system 305 obtains frame data comprising the resulting signals from the receiver electrodes at each of the scan steps), the processing system 305 determines user input of a user (e.g., whether the user touched the touch screen of the input device 300). During one or more scan steps, the input device 300 may encounter burst noise and/or impulse noise. For instance, during a first scan step, the input device 300 may encounter burst noise, which may cause errors with respect to the detection of the user input (e.g., based on the burst noise or impulse noise, there may be a "ghost finger" error (detecting a finger on the touchscreen even though the user did not touch the touchscreen) or a "finger drop" error (not detecting a finger on the touchscreen when the user did actually touch the touchscreen).

Burst and impulse noise occurs at signal levels far higher than the signal levels for an ordinary resulting signal obtained via receiver electrodes, the processing system 305 includes a signal level monitor 320 that is configured to detect the burst noise or impulse noise. For instance, during charging of the input device 300, the input device 300 may encounter burst noise and/or impulse noise during one or more of the scan steps. The signal level monitor 320 may detect the burst noise and/or impulse noise. Based on detection of the burst noise and/or the impulse noise, the processing system 305 restarts the current scan step. In some instances, the processing system 305 may immediately restart the current scan step (e.g., in response to detecting the burst noise/impulse noise, the processing system 305 restarts the current scan step). For instance, as mentioned above, for each scan step, the processing system 305 provides instructions to drive one or more transmitter electrodes in a certain way (e.g., driving a first transmitter electrode or a first set of transmitter electrodes, or driving all of the transmitter electrodes according to a respective pattern corresponding to the respective scan step). In response to the signal level monitor 320 detecting the impulse noise and/or the burst noise (e.g., based on a resulting signal obtained via a receiver electrode having an amplitude that is above a certain threshold), the processing system 305 restarts the scan step. For instance, the processing system 305 provides second instructions to again drive the same one or more transmitter electrodes in the same way corresponding to the scan step in which the impulse noise and/or burst noise was detected. If impulse noise and/or burst noise is not detected during a respective scan step, the processing system 305 completes the scan step, and moves to the next scan step (e.g., provides instructions to drive a second transmitter electrode or a second set of transmitter electrodes or drive all of the transmitter electrodes according to a next pattern corresponding to the next scan step). The processing system 305 continues to obtain resulting signals from the scan steps until all of the scan steps are completed, with respective scan steps being restarted as needed throughout the process based on detection of impulse or burst noise.

The signal level monitor 320 may include hardware (e.g., circuit elements) and/or software that is capable of detecting burst noise and/or impulse noise. For example, impulse noise and burst noise have common characteristics. For instance, impulse and burst noise have high amplitudes (e.g., impulse noise is around 1.2 kiloVolts (kV) and burst noise is around 4 kV) and the pulse width is narrow (e.g., impulse noise is around 1 µs and burst is around 30 to 60 nanoseconds (ns)). As such, the signal level monitor 320 may include hardware and/or software that is capable of detecting impulse and/or burst noise based on their common characteristics. In some instances, the signal level monitor 320 may be implemented by one or more hardware components such as a comparator. For instance, the comparator may compare a signal (e.g., an obtained resulting signal) with a noise threshold. Because the impulse noise and burst noise are around 1.2 kV and 4 kV whereas typical signals are considerably less (e.g., generally under 100 V), the signal level monitor 320 (e.g., a comparator) may use a noise threshold (e.g., a threshold of 1 kV, 500V, or another threshold value that is capable of detecting the high amplitudes of both the burst noise and the impulse noise) to detect burst noise and/or impulse noise. The signal level monitor 320 (e.g., a comparator) may provide information indicating detection of burst noise and/or impulse noise. For instance, based on an input of the comparator being greater than the noise threshold, the comparator may provide information to a processor or controller of the processing system 305 indicating detection of the burst noise and/or impulse noise. Based on the detection, the processing system 305 may restart the current scan step. In some variations, the signal level monitor 320 may be used in an analog domain. When the signal level monitor 320 is in the analog front end (e.g., in the analog domain), a charge amplifier (which is described below) may be configured as an attenuator, so the incoming signal/noise are attenuated to a lower voltage signal after the charge amplifier and prior to the signal level monitor 320 comparing the signal with a threshold level. In other variations, the signal level monitor 320 may be used in a digital domain. This will be described in further detail in FIGS. 4 and 5 below.

In some instances, the signal level monitor 320 may include additional hardware components that are used with the comparator to detect the burst noise and/or impulse noise. For instance, the signal level monitor 320 may use one or more filters along with the comparator to detect the burst noise/impulse noise. In other instances, the signal level monitor 320 may provide one or more alternative hardware components to detect the burst noise and/or impulse noise.

In some examples, the signal level monitor 320 may be implemented using software (e.g., one or more instructions stored in memory). For instance, the processing system 305 may include one or more processors and/or controllers. The one or more processors may execute instructions stored in memory so as to compare the signals with the noise threshold. Based on the comparison (e.g., if the signal exceeds the noise threshold), the one or more processors may determine that burst noise and/or impulse noise has been detected, and restart the current scan step.

It will be appreciated that the exemplary input device 300 depicted in FIG. 3 is merely an example, and that the principles discussed herein may also be applicable to other input devices. It will further be appreciated that although the examples discussed above have been given in connection with a transcapacitive example having transmitter and receiver electrodes, it will be appreciated that the principles discussed here are also applicable to touch sensing based on absolute capacitance, in which the sensing signals are driven onto the same electrodes through which the resulting signals are obtained.

Figure 4:
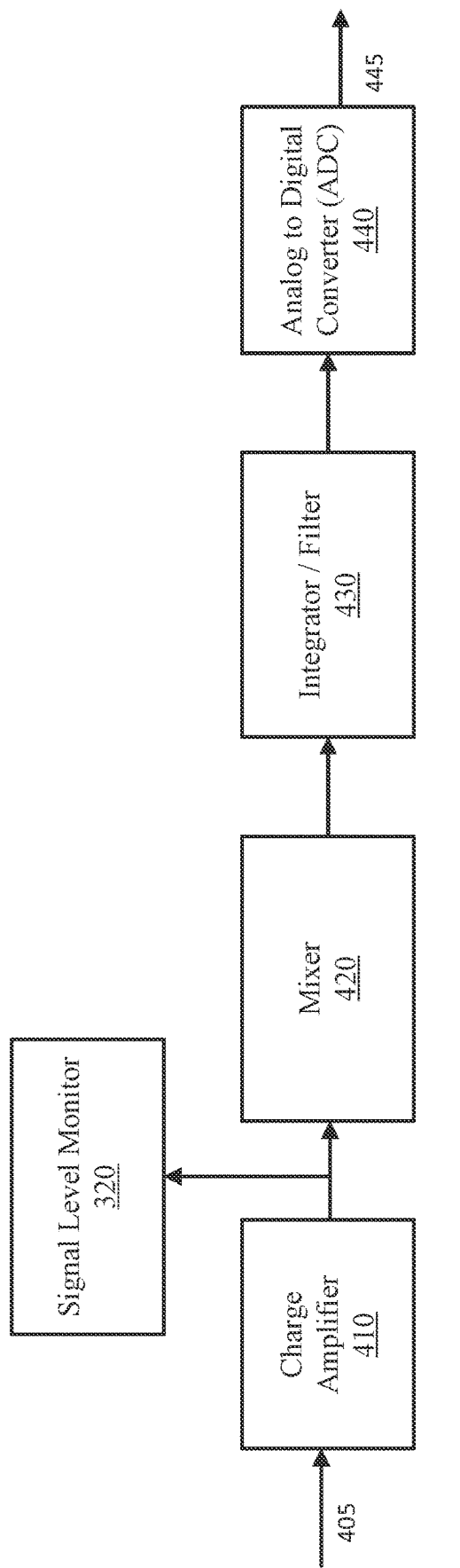
FIG. 4 is a block diagram depicting exemplary circuitry including a signal level monitor for mitigating burst noise and impulse noise according to one or more examples of the present application.

FIG. 4 is a block diagram depicting exemplary circuitry 400 including a signal level monitor 320 for mitigating burst noise and impulse noise according to one or more examples of the present application. In particular, the circuitry 400 may be an analog embodiment for detecting the burst noise and/or impulse noise (e.g., the signal level monitor 320 may detect the burst noise and/or impulse noise prior to the analog to digital converter (ADC) 440 converting the signal from analog to digital). The circuitry 400 includes a charge amplifier 410, a signal level monitor 320, a mixer 420, an integrator/filter 430, and an ADC 440.

In operation, the input signal 405 is from the touch sensor (e.g., the set of electrodes 310) and is fed to the charge amplifier 410. For instance, the charge amplifier 410 receives the input signal 405 from the touch sensor. The charge amplifier 410 converts the charge signal from the touch sensor (e.g., the sensor capacitor) into voltages, and works as an attenuator to scale down the transmitter signal and all kinds of noise to a level that can be processed with low voltage circuits. The charge amplifier 410 then outputs the converted charge signal to the mixer 420. The mixer 420 processes (e.g., multiplies) the output signal from the charge amplifier 410 with a waveform with the same frequency as the transmitter signal, thus shifting the signal from the transmitter frequency into direct current (DC). The integrator/filter 430 filters out high frequency noise and integrates the signal in one sensing step time period. The ADC 440 converts the resultant signal from the integrator/filter 430 into one digital value, which is then able to be process by a microprocessor (e.g., a controller or processor of the processing system 305) and/or digital signal processor (DSP). The output signal 445 from the ADC 440 is provided to the microprocessor and/or the DSP for touch comparison (e.g., to calculate the touch location, speed, and so on).

The signal level monitor 320 is configured to detect burst noise and/or impulse noise, and provide the detection of the burst noise and/or impulses noise to one or more processors and/or controllers of the processing system 305. For instance, the signal level monitor 320 compares the incoming signal from the charge amplifier 410 with a threshold to determine whether the signal is out of range or not. In some instances, the signal level monitor 320 may be and/or include a comparator (e.g., a comparator that compares values in an analog domain).

In some instances, a current conveyor may replace the charge amplifier 410 and/or may be included along with the charge amplifier 410. For instance, within the analog front end (AFE), the analog circuit may include a charge amplifier (e.g., the charge amplifier 410) and/or a current conveyer. The current conveyer may be used for absolute capacitance sensing as well as transcapacitance sensing. The current conveyer measures the current going through touch sensor (e.g., the sensor capacitor) and converts it into an internal current signal. The current signal is then provided to the mixer 420.

Figure 5:
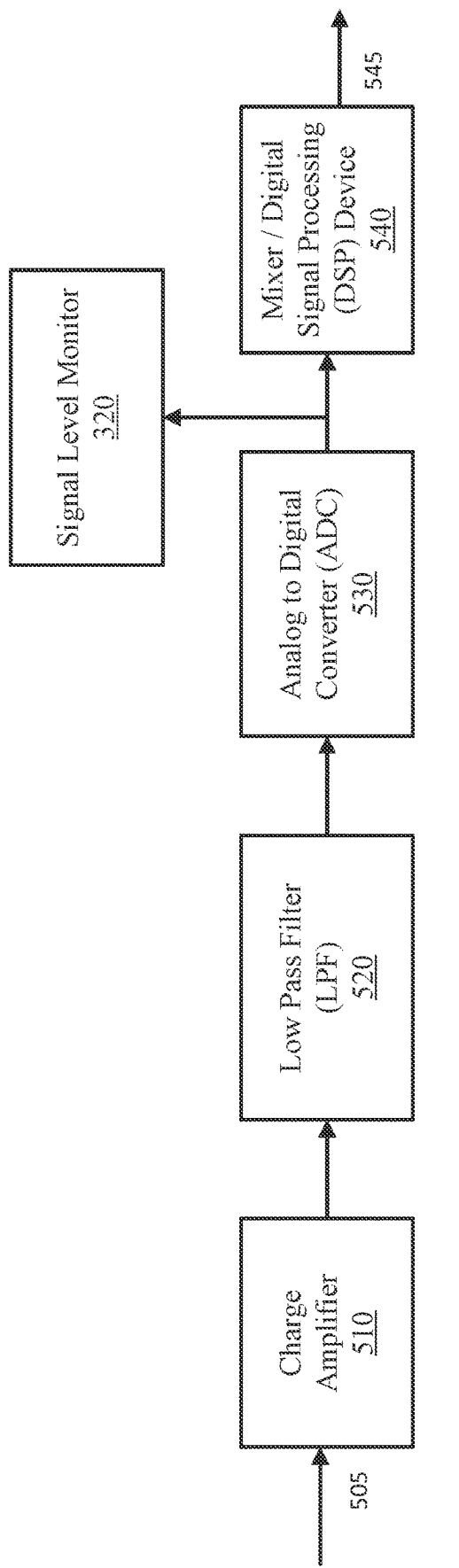
FIG. 5 is another block diagram depicting exemplary circuitry including a signal level monitor for mitigating burst noise and impulse noise according to one or more examples of the present application.

FIG. 5 is another block diagram depicting exemplary circuitry including a signal level monitor for mitigating burst noise and impulse noise according to one or more examples of the present application. In particular, the circuitry 500 may be a digital embodiment for detecting the burst noise and/or impulse noise (e.g., the signal level monitor 320 may detect the burst noise and/or impulse noise after the ADC 530 converting the signal from analog to digital domain). The circuitry 500 includes a charge amplifier 510, a low pass filter (LPF) 520, an ADC 530, a signal level monitor 320, and a mixer/digital signal processing (DSP) device 540.

In operation, the charge amplifier 510 and the ADC 530 may function similarly to the charge amplifier 410 and the ADC 440 described above. For instance, the charge amplifier 510 may receive an input signal 505 from the touch sensor. The LPF 520 is a low pass filter, which is used to attenuate the high frequency noise. The mixer/DSP device 540 implements the mixer function in the digital domain. For instance, the mixer/DSP device 540 may be configured to perform the functionalities of the mixer 420 and the integrator/filter 430 described above. The output signal 545 from the mixer/DSP device 540 may be provided to the microprocessor.

The signal level monitor 320 is configured to detect burst noise and/or impulse noise, and provide the detection of the burst noise and/or impulses noise to one or more processors and/or controllers of the processing system 305. In some instances, the signal level monitor 320 may be and/or include a comparator (e.g., a comparator that compares values in a digital domain).

It will be appreciated that the exemplary circuitry 400 or 500 depicted in FIG. 4 or 5 are merely examples, and that the principles discussed herein may also be applicable to other circuitry for detecting burst/impulse noise.

Figure 6:
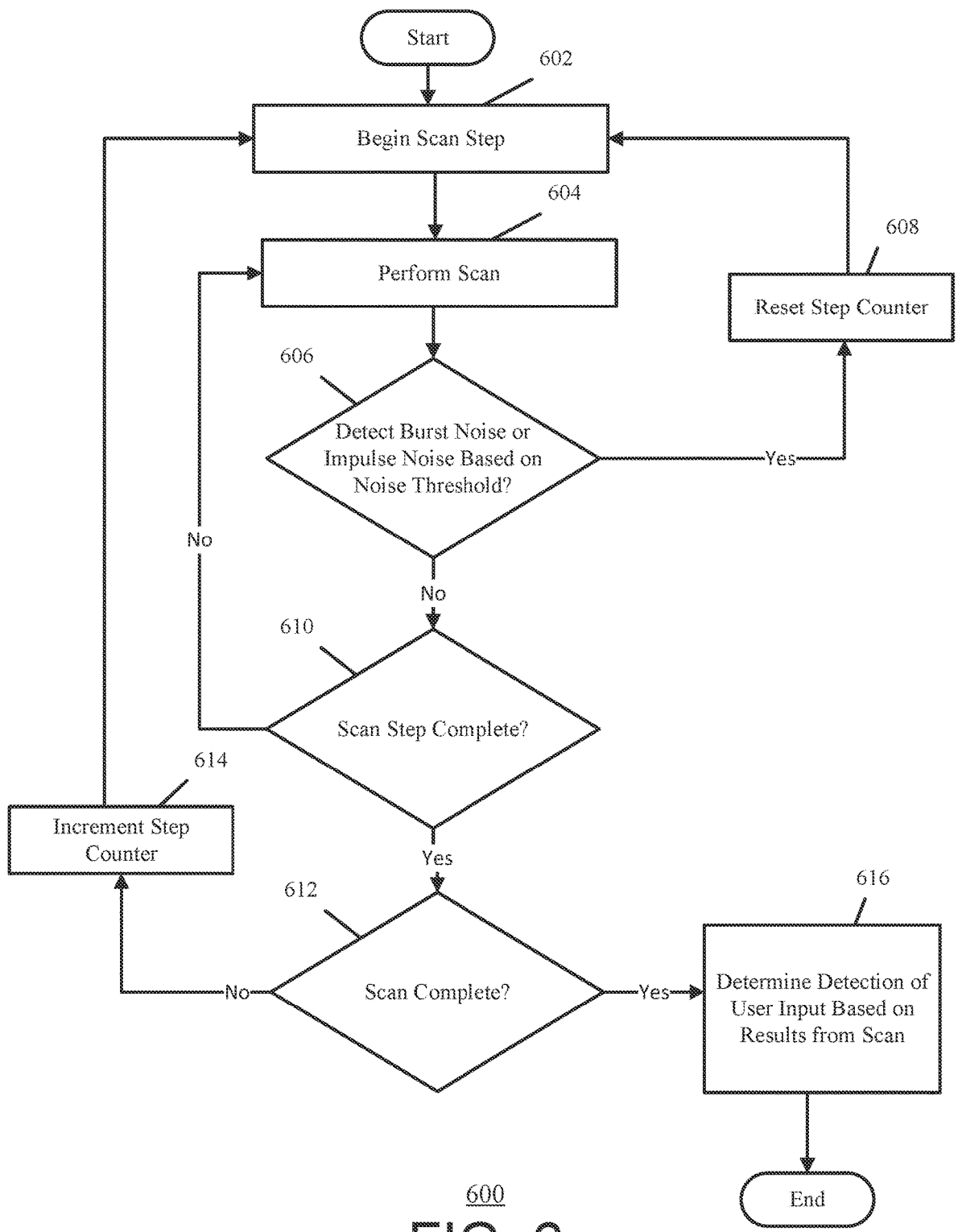
FIG. 6 is a flowchart of an exemplary process for mitigating burst noise and impulse noise according to one or more examples of the present application.

FIG. 6 is a flowchart of an exemplary process 600 for mitigating burst noise and impulse noise according to one or more examples of the present application. The process 600 may be performed by the input device 300 and in particular, the processing system 305 shown in FIG. 3. However, it will be recognized that any of the following blocks may be performed in any suitable order, and that the process 600 may be performed in any suitable environment. The descriptions, illustrations, and processes of FIG. 6 are merely exemplary and the process 600 may use other descriptions, illustrations, and processes for mitigating burst noise and impulse noise.

In operation, at block 602, the processing system 305 begins a scan step. At block 604, the processing system 305 performs the scan. For instance, as mentioned previously, the set of electrodes 310 may include transmitter electrodes and receiver electrodes. At each scan step, the processing system 305 drives one or more transmitter electrodes with one or more sensing signals to generate a corresponding capacitive response in the form of resulting signals obtainable via one or more receiver electrodes. In some instances, based on the particular scan step, the processing system 305 may determine (e.g., identify) the transmitter electrodes that are to be driven, and then drive these identified transmitter electrodes.

At block 606, the processing system 305 determines whether burst noise or impulse noise is detected based on a noise threshold. For example, the processing system 305 uses a signal level monitor 320 to determine whether burse noise or impulse noise is detected. In some instances, the signal level monitor 320 is a comparator, and compares the signal with a noise threshold. Based on the signal exceeding the noise threshold, the signal level monitor 320 provides an indication indicating detection of the burst noise or impulse noise to a processor of the processing system 305. Then, process 600 moves to block 608. Based on the signal not exceeding the noise threshold, the process 600 moves to block 610.

At block 608, the processing system 305 resets the step counter (e.g., keeps the step counter associated with the scan step the same), and moves back to block 602. At block 602 and block 604, the processing system 305 begins the same scan step as previously, and performs the scan. For instance, based on detection of burst noise or impulse noise, the processing system 305 stops performing the scan step and restarts the scan step from the beginning again (e.g., drives the first transmitter electrode and/or a first set of transmitter electrodes to obtain the resulting signals).

At block 610, the processing system 305 checks to see if the scan step is complete. If not, process 600 moves back to block 604. If so, process 600 moves to block 612. For example, if the scan step is not complete, the processing system 305 continues performing the scan (block 604) and continues determining whether burst noise or impulse noise is detected (block 606). Once the scan step completes, process 600 moves to block 612. As such, the process 600 first checks whether the scan step completes. If so, the process moves to block 612, which checks whether the entire scan is complete. Block 612 is described in further detail below.

Figure 7:
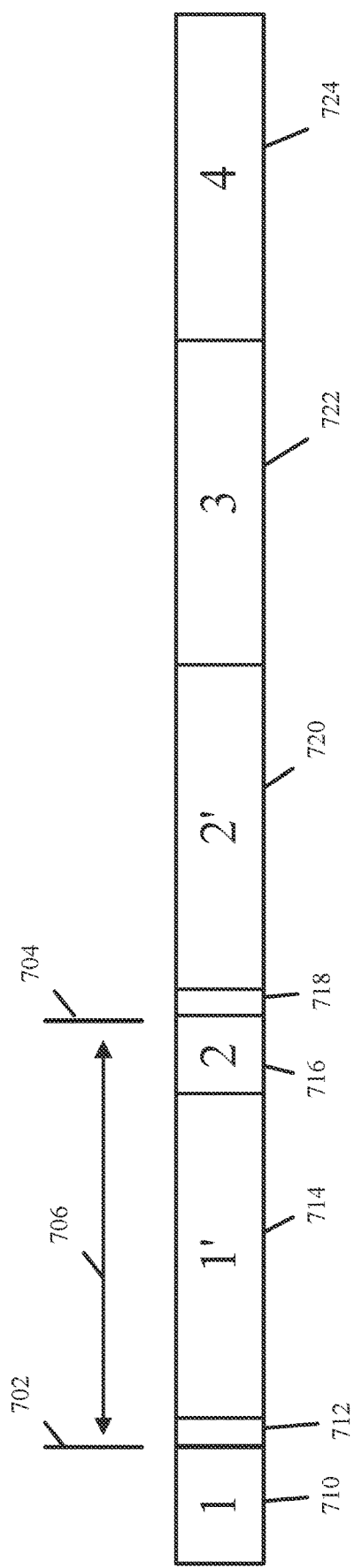
FIG. 7 depicts an exemplary representation of an input device performing scan steps and encountering noise according to one or more examples of the present application.

FIG. 7 depicts an exemplary representation 700 of an input device performing scan steps and encountering noise (e.g., impulse and/or burst noise) according to one or more examples of the present application. FIG. 7 will be used to describe FIG. 6, including blocks 602-610, in more detail. In particular, FIG. 7 shows a plurality of scan steps (e.g., scan steps 1 through 4) being performed by the input device 300 over a time period as well as restarting and re-performing the scan steps in response to detecting impulse or burst noise.

For instance, the processing system 305 begins and performs a first scan step (e.g., driving a first transmitter electrode and/or a first set of transmitter electrodes), which is denoted by block 710. At instance 702 (e.g., an instance in time), the signal level monitor 320 detects burst noise. As such, the processing system 305 restarts the first scan step (e.g., referring back to FIG. 6, process 600 moves back to block 602). Block 712 denotes the time length required for the processing system 305 to reset the scan step so as to restart the first scan step. Then, the processing system 305 performs the first scan step again, which is denoted by "1'". In the example shown in FIG. 7, the signal level monitor 320 does not detect burst noise and/or impulse noise when re-performing the first scan step (e.g., during 1', which is denoted by block 714), and the processing system 305 finishes the first scan step and moves to the second scan step (denoted by block 716 and "2").

For instance, the signal level monitor 320 may be in the analog front end (AFE), which may be analog (before the ADC) or digital (after the ADC). The signal level monitor 320 is configured to detect impulse noise and/or burst noise, which may be from the display and/or a charger. For instance, the signal level monitor 320 may use a threshold (e.g., because the impulse noise and/or burst noise amplitudes, the threshold may be around 40 V peak to peak). The threshold may be configurable (e.g., a user may provide input indicating the threshold to the processing system 305). Since impulse noise and burst noise have a much higher amplitude, the signal level monitor 320 is configured to detect when the input device 300 is impacted by the impulse noise or burst noise. When the burst and/or impulse noise is detected, the variables related to the step scan are reset to their original value, and the step scan immediately restarts (e.g., within a few microseconds). For example, as shown in block 608, the processing system 305 resets the step counter and/or other variables. The variables may include, but are not limited to, the parameters related to the scan step such as parameter control transmitter waveforms (e.g., phase, frequency, and so on) and/or parameters that indicate the step progress (e.g., cycle counters and so on).

Further, the processing system 305 may configure the scan step length to be less than a threshold value such as 200 µs (e.g., to be around or less than 195 µs) based on a known characteristic of burst noise. For instance, burst noise, when it occurs, is known to occur with a separation between consecutive burst noise events of at least 200 µs. Accordingly, by setting the scan step length to be less than 200 µs, then the restarted scan step is configured to avoid a next burst noise event because the restarted scan step will end before the next burst noise event is expected to occur. In other words, while burst noise may not always be periodic, burst noise typically occurs with some time in-between neighboring bursts. As such, by using a scan step length to be less than 200 µs, this permits there to be enough quiet time between even non-periodic neighboring bursts to complete a scan step.

Referring back to FIG. 6, after the scan step is complete, at block 612, the processing system 305 determines whether the scan (e.g., the entire scan) is complete. For example, as mentioned previously, the processing system 305 may use a plurality of scan steps (e.g., 20 scan steps) to determine whether user input is detected. At block 612, the processing system 305 determines whether the scan has been completed (e.g., whether the processing system 305 has performed all 20 scan steps). Based on the scan being completed, process 600 moves to block 616. Otherwise, process 600 moves to block 614.

At block 614, the processing system 305 increments the step counter. For instance, after completing the first scan step, the processing system 305 increments the step counter to the second scan step. Then, process 600 moves back to block 602, and the processing system 305 begins and performs the second scan step. For instance, the processing system 305 drives one or more transmitter electrodes (e.g., a second transmitter electrode and/or a second set of transmitter electrodes) with one or more sensing signals that are detectable by one or more receiver electrodes. In the second scan step, in some instances, the processing system 305 may drive one or more transmitter electrodes that were not driven in the first scan step (e.g., the second scan step drives a second transmitter electrode whereas the first scan step drives a first transmitter electrode). In other instances, in the second scan step, the processing system 305 may drive one or more of the same transmitter electrodes as the first scan step (e.g., the second set of transmitter electrodes may include one or more transmitter electrodes that were driven in the first scan step).

The process 600 may continue until the scan is complete. After the scan is complete (e.g., after the 20 scan steps), the process 600 moves to block 616. At block 616, the processing system 305 determines detection of user input based on results from the scan. For instance, for each scan step, the processing system 305 obtains resulting signals via the receiver electrodes. Based on the resulting signals, the processing system 305 determines detection of the user input (e.g., determines whether there is user input detected). Then, process 600 ends.

Referring back to FIG. 7, after the first scan step completes (e.g., the scan step denoted by 1'), then the second scan step is initiated at block 716. At instance 704, the signal level monitor 320 detects burst noise. Indicator 706 shows a time span of 200 us between the burst noises 702 and 704. As such, by causing the scan step length to be less than 200 μs, the first scan step may be completed in time.

After detection of the burst noise, and similar to block 712, the processing system 305 restarts the second scan step. In particular, block 718 denotes the time length required for the processing system 305 to reset the scan step so as to restart the second scan step. Then, the processing system 305 performs the first scan step again, which is denoted by "2'" and block 720. In the example shown in FIG. 7, the signal level monitor 320 does not detect burst noise and/or impulse noise when re-performing the second scan step (e.g., during 2'), and the processing system 305 finishes the second scan step and moves to the third scan step (denoted by block 722 and "3"). The processing system 305 then moves to a fourth scan step (denoted by block 724 and "4") after finishing the third scan step. The processing system 305 does not detect any burst noise or impulse noise in the third and fourth scan steps 722 and 724, and as such, the processing system 305 performs the scan steps, and does not restart these scan steps. FIG. 7 is merely exemplary, and the processing system 305 may be used to detect impulse noise as well as burst noise, and the detection of the impulse noise and/or burst noise may occur at any scan step (e.g., the first 15 scan steps might not encounter any impulse or burst noise, but the 16$^{th}$ scan step may encounter impulse noise).

Figure 8:
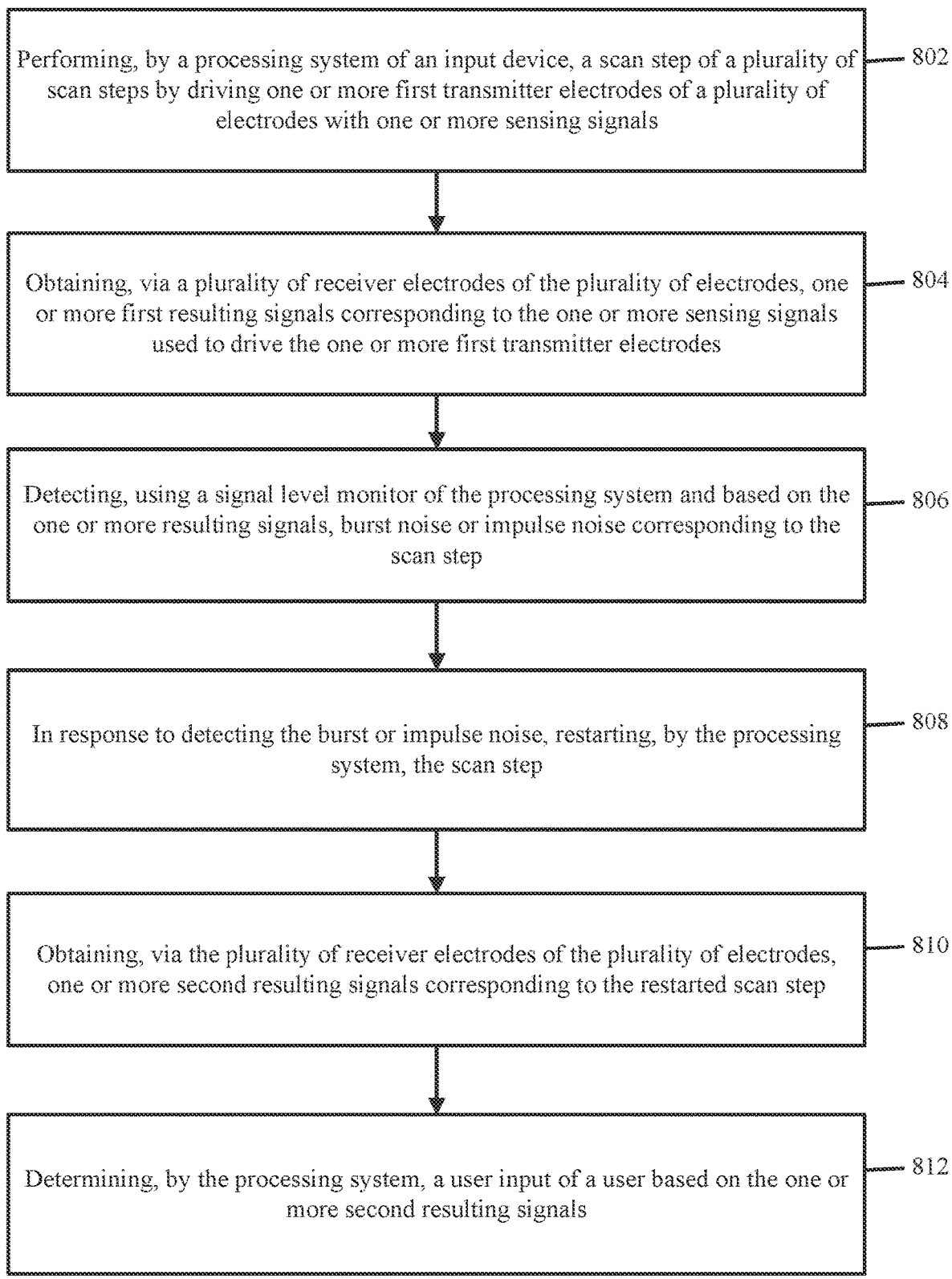
FIG. 8 is another flowchart of an exemplary process for mitigating burst noise and impulse noise according to one or more examples of the present application.

FIG. 8 is another flowchart of an exemplary process for mitigating burst noise and impulse noise according to one or more examples of the present application. The process 800 may be performed by the input device 300 and in particular, the processing system 305 shown in FIG. 3. However, it will be recognized that any of the following blocks may be performed in any suitable order, and that the process 800 may be performed in any suitable environment. The descriptions, illustrations, and processes of FIG. 8 are merely exemplary and the process 800 may use other descriptions, illustrations, and processes for mitigating burst noise and impulse noise.

At block 802, the processing system of the input device performs a scan step of a plurality of scan steps by driving one or more first transmitter electrodes of a plurality of electrodes with one or more sensing signals.

At block 804, the processing system obtains, via a plurality of receiver electrodes of the plurality of electrodes, one or more first resulting signals corresponding to the one or more sensing signals used to drive the one or more transmitter electrodes.

At block 806, the processing system detects, using a signal level monitor of the processing system and based on the one or more resulting signals, burst noise or impulse noise corresponding to the scan step. For instance, as mentioned above in blocks 602-606 of FIG. 6, the processing system may use a signal level monitor (e.g., a hardware component such as a comparator and/or instructions stored in memory) to compare a signal (e.g., the resulting signals) with a noise threshold. Based on the comparison, the processing system may detect burst noise and/or impulse noise corresponding to the scan step.

At block 808, in response to detecting the burst noise or the impulse noise, the processing system restarts the scan step. For instance, referring to blocks 608 and 602 of FIG. 6, based on detecting the burst noise or the impulse noise, the processing system may reset the step counter and/or other variables, and restart the scan step (e.g., restart the first scan step).

At block 810, the processing system obtains, via the plurality of receiver electrodes of the plurality of electrodes, one or more second resulting signals corresponding to the restarted scan step. For example, after restarting the scan step, the processing system may drive the transmitter electrodes again, and obtain resulting signals based on driving the transmitter electrodes.

At block 812, the processing system determines a user input of a user based on the one or more second resulting signals. For instance, after completing the scan, the processing system may use the resulting signals from the restarted scan to determine whether user input is detected. For example, instead of using resulting signals from the scan step with burst and/or impulse noise, the processing system may restart (e.g., immediately restart) the scan step, and discard the results from the initial scan step. Then, the processing system may obtain resulting signals from the restarted scan (e.g., the second resulting signals), and use these resulting signals for determining whether user input is detected.

In some instances, the methods described above (e.g., process 800) may be used for absolute capacitance sensing. For instance, the signal level monitor 320 of FIG. 4 and/or FIG. 5 may be used for both transcapacitive sensing as well as absolute capacitance sensing. For absolute capacitance sensing, the reference of the first stage amplifier (e.g., the charge amplifier 410/510) and/or a current conveyor may be driven. In other words, for transcapacitive sensing, the reference may be connected to a fixed reference voltage whereas for absolute capacitance sensing, the reference may be driven with a transmitter waveform.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device, comprising:
    a set of electrodes configured to detect a user input of a user, wherein the set of electrodes comprises:
        a plurality of transmitter electrodes; and
        a plurality of receiver electrodes; and
    a processing system comprising:
        a signal level monitor configured to detect burst noise or impulse noise; and
        one or more processors configured to:
            perform a scan step of a plurality of scan steps by driving one or more first transmitter electrodes of the plurality of transmitter electrodes with one or more sensing signals;
            obtain, via one or more receiver electrodes of the plurality of receiver electrodes, one or more first resulting signals corresponding to the one or more sensing signals used to drive the one or more first transmitter electrodes;
            detect, using the signal level monitor and based on the one or more first resulting signals, the burst noise or the impulse noise corresponding to the scan step;
            in response to detecting the burst noise or the impulse noise, restart the scan step;
            obtain, via the one or more receiver electrodes, one or more second resulting signals corresponding to the restarted scan step; and
            determine the user input of the user based on the one or more second resulting signals.

2. The input device of claim 1, wherein the signal level monitor comprises one or more hardware circuit elements, wherein the one or more hardware circuit elements comprises a comparator for comparing the one or more first resulting signals with a threshold.

3. The input device of claim 2, wherein the one or more hardware circuit elements further comprises one or more filters.

4. The input device of claim 1, wherein the processing system comprises a charge amplifier, wherein the charge amplifier is configured to obtain the one or more first resulting signals and attenuate the one or more first resulting signals, wherein the charge amplifier is configured to provide the one or more attenuated first resulting signals to the signal level monitor, and wherein the signal level monitor is configured to compare the one or more attenuated first resulting signals with a threshold to detect the burst noise or the impulse noise.

5. The input device of claim 4, wherein the one or more attenuated first resulting signals is in an analog domain, and wherein the signal level monitor is configured to compare the one or more attenuated first resulting signals with the threshold in the analog domain.

6. The input device of claim 4, wherein the processing system further comprises a mixer and an integrator/filter, wherein the charge amplifier is configured to provide the one or more attenuated first resulting signals to the signal level monitor and the mixer.

7. The input device of claim 1, wherein the processing system comprises an analog to digital converter (ADC), wherein the ADC is configured to:
    obtain the one or more first resulting signals;
    convert the one or more first resulting signals into one or more digital signals; and
    provide the one or more converted first resulting signals to the signal level monitor.

8. The input device of claim 7, wherein the signal level monitor is configured to compare the one or more converted first resulting signals with a threshold to detect the burst noise or the impulse noise.

9. The input device of claim 8, wherein the processing system further comprises a charge amplifier, a low pass filter, and a mixer/digital signal processing (DSP) device.

10. The input device of claim 1, wherein the one or more processors are configured to restart the scan step by resetting a step counter and one or more parameters controlling transmitter waveforms.

11. The input device of claim 1, wherein the one or more processors are further configured to set a length of the scan step to a time value.

12. A method, comprising:
    performing, by an input device, a scan step of a plurality of scan steps by driving one or more transmitter electrodes with one or more sensing signals;
    obtaining, by the input device and via one or more receiver electrodes, one or more first resulting signals corresponding to the one or more sensing signals used to drive the one or more transmitter electrodes;
    detecting, by the input device, using a signal level monitor, and based on the one or more first resulting signals, burst noise or impulse noise corresponding to the scan step;
    in response to detecting the burst noise or the impulse noise, restarting, by the input device, the scan step;
    obtaining, by the input device and via the one or more receiver electrodes, one or more second resulting signals corresponding to the restarted scan step; and
    determining, by the input device, a user input of a user based on the one or more second resulting signals.

13. The method of claim 12, wherein the signal level monitor comprises one or more hardware circuit elements, wherein the one or more hardware circuit elements comprises a comparator, and wherein the method further comprises:

comparing, using the comparator, the one or more first resulting signals with a threshold.

14. The method of claim 13, wherein the one or more hardware circuit elements further comprises one or more filters.

15. The method of claim 12, wherein the input device further comprises a charge amplifier, wherein obtaining the one or more first resulting signals comprises obtaining the one or more first resulting signals using the charge amplifier, wherein the method further comprises:

attenuating the one or more first resulting signals using the charge amplifier; and comparing, using the signal level monitor, the one or more attenuated first resulting signals with a threshold to detect the burst noise or the impulse noise.

16. The method of claim 15, wherein the one or more attenuated first resulting signals is in an analog domain.

17. The method of claim 12, wherein the input device further comprises an analog to digital converter (ADC), wherein the method further comprises:

converting the one or more first resulting signals into one or more digital signals using the ADC; and providing the one or more converted first resulting signals to the signal level monitor.

18. The method of claim 17, further comprising:

comparing the one or more converted first resulting signals with a threshold to detect the burst noise or the impulse noise.

19. The method of claim 12, wherein resetting the scan step comprises resetting a step counter and one or more parameters controlling transmitter waveforms.

20. A non-transitory computer-readable medium having processor-executable instructions stored thereon, the processor-executable instructions, when executed, facilitating performance of the following:

performing a scan step of a plurality of scan steps by driving one or more transmitter electrodes with one or more sensing signals;

obtaining, via one or more receiver electrodes, one or more first resulting signals corresponding to the one or more sensing signals used to drive the one or more transmitter electrodes;

detecting, using a signal level monitor and based on the one or more first resulting signals, burst noise or impulse noise corresponding to the scan step;

in response to detecting the burst noise or the impulse noise, restarting the scan step;

obtaining, via the one or more receiver electrodes, one or more second resulting signals corresponding to the restarted scan step; and determining a user input of a user based on the one or more second resulting signals.

* * * * *